United States Patent
Shahpar et al.

(10) Patent No.: US 10,968,749 B2
(45) Date of Patent: Apr. 6, 2021

(54) COMBUSTION CHAMBER ARRANGEMENT AND A GAS TURBINE ENGINE COMPRISING A COMBUSTION CHAMBER ARRANGEMENT

(71) Applicant: ROLLS-ROYCE plc, London (GB)

(72) Inventors: Shahrokh Shahpar, Derby (GB); John Coull, Cambridge (GB); Matthew Symes, Cambridge (GB)

(73) Assignee: ROLLS-ROYCE plc, London (GB)

( * ) Notice: Subject to any disclaimer, the term of this patent is extended or adjusted under 35 U.S.C. 154(b) by 79 days.

(21) Appl. No.: 16/393,137

(22) Filed: Apr. 24, 2019

(65) Prior Publication Data
US 2019/0323355 A1  Oct. 24, 2019

(30) Foreign Application Priority Data
Apr. 24, 2018 (GB) ..................................... 1806631

(51) Int. Cl.
| F01D 5/00 | (2006.01) |
| F01D 5/14 | (2006.01) |
| F01D 9/04 | (2006.01) |

(52) U.S. Cl.
CPC .............. *F01D 5/143* (2013.01); *F01D 9/041* (2013.01); *F05D 2220/32* (2013.01); *F05D 2240/121* (2013.01); *F05D 2240/122* (2013.01)

(58) Field of Classification Search
None
See application file for complete search history.

(56) References Cited

U.S. PATENT DOCUMENTS

| 5,466,123 | A | 11/1995 | Rose |
| 6,283,713 | B1 | 9/2001 | Harvey et al. |
| 9,085,985 | B2 * | 7/2015 | Barr .................. F01D 5/143 |
| 9,188,017 | B2 | 11/2015 | Xu |

(Continued)

FOREIGN PATENT DOCUMENTS

| EP | 1424467 A2 | 6/2004 |
| EP | 2947390 A1 | 11/2015 |

(Continued)

OTHER PUBLICATIONS

Rahim et al, Effect of Nozzle Guide Vane Lean Under Influence of Inlet Temperature Traverse, 2014 (Year: 2014).*

(Continued)

*Primary Examiner* — Todd E Manahan
*Assistant Examiner* — Edwin Kang
(74) *Attorney, Agent, or Firm* — Oliff PLC

(57) ABSTRACT

A combustion chamber arrangement includes an annular combustion chamber, a plurality of lean burn fuel injectors and a stage of turbine nozzle guide vanes. The stage of turbine nozzle guide vanes is arranged at the downstream end of the annular combustion chamber and includes a plurality of circumferentially spaced vanes extending between and being secured to an annular inner wall and an annular outer wall. The annular inner wall has an outer surface which has a plurality of outer surface portions and each portion is positioned between a pair of circumferentially adjacent vanes and the annular outer wall has an inner surface which has a plurality of inner surface portions and each portion is positioned between a pair of circumferentially adjacent vanes.

17 Claims, 4 Drawing Sheets

(56) References Cited

U.S. PATENT DOCUMENTS

| | | |
|---|---|---|
| 2002/0011064 A1 | 1/2002 | Crocker et al. |
| 2006/0233641 A1* | 10/2006 | Lee ............... F01D 5/143 415/208.1 |
| 2008/0267772 A1 | 10/2008 | Harvey et al. |
| 2010/0080708 A1* | 4/2010 | Gupta ............. F01D 9/04 416/223 A |
| 2010/0158696 A1* | 6/2010 | Pandey ........... F01D 5/145 416/243 |
| 2012/0051894 A1 | 3/2012 | Clements et al. |
| 2013/0224027 A1* | 8/2013 | Barr ............... F01D 5/143 416/193 A |
| 2014/0154068 A1 | 6/2014 | Aggarwala et al. |
| 2014/0245741 A1 | 9/2014 | He et al. |
| 2017/0226878 A1 | 8/2017 | Brozyna et al. |
| 2017/0226880 A1 | 8/2017 | Winn et al. |
| 2017/0234161 A1* | 8/2017 | Bunker ........... F01D 9/044 60/805 |
| 2018/0335214 A1* | 11/2018 | Strickland ....... F23R 3/286 |

FOREIGN PATENT DOCUMENTS

| | | |
|---|---|---|
| EP | 3064706 A1 | 9/2016 |
| EP | 3165825 A1 | 5/2017 |
| WO | 2015/076961 A1 | 5/2015 |

OTHER PUBLICATIONS

Shahpar et al. "Adjoint Optimisation of a High Pressure Turbine Stage for a Lean-Burn Combustion System" CFD Methods, Design System Engineering, Rolls-Royce plc , pp. 1-9. 2012.

Shahpar et al. "Aerodynamic Optimization of High-Pressure Turbines for Lean-Burn Combustion System" Journal of Engineering for Gas Turbines and Power, vol. 135, pp. 055001-1-055001-11, May 2013.

Oct. 17, 2018 British Search Report issued in British Patent Application No. 1806631.6.

May 21, 2019 European Search Report issued in European Patent Application No. 19169876.

* cited by examiner

COMBUSTION CHAMBER ARRANGEMENT AND A GAS TURBINE ENGINE COMPRISING A COMBUSTION CHAMBER ARRANGEMENT

The present disclosure relates to a combustion chamber arrangement and in particular to a combustion chamber arrangement for a gas turbine engine.

Combustion chamber arrangements currently have rich burn fuel injectors. However, some combustion chamber arrangements have lean burn fuel injectors to reduce emissions of nitrous oxides (NOX). Lean burn fuel injectors comprise a plurality of air swirlers to swirl air supplied into the combustion chamber in order to make use of the high flow swirl to maintain flame stability within the combustion chamber. The swirling flow in the combustion chamber may persist downstream of the turbine nozzle guide vanes (NGVs), changing the loading on the turbine rotor blades, leading to a reduction in efficiency of the turbine. The swirling flow in the combustion chamber results in an incidence variation on the turbine nozzle guide vanes (NGVs). The swirling flow produces a circumferential non-uniform temperature distribution and the circumferential non-uniform temperature distribution may affect the heat load on the turbine nozzle guide vanes (NGVs) and the following turbine rotor blades.

It is known to provide profiled end walls (PEWS) for the turbine nozzle guide vanes to improve the aerodynamic performance of the turbine nozzle guide vanes. The profiled end walls (PEWS) comprise a non-axisymmetric end wall design which is arranged within each passage circumferentially between circumferentially adjacent vanes of the turbine nozzle guide vanes (NGVs) to control the cross-passage pressure gradients which may reduce the secondary-flow passage vortices.

According to a first aspect there is provided a combustion chamber arrangement comprising an annular combustion chamber, a plurality of lean burn fuel injectors and a stage of turbine nozzle guide vanes, the annular combustion chamber comprising an annular upstream end wall having a plurality of circumferentially spaced apertures and an annular downstream end, each lean fuel injector comprising a plurality of coaxial air swirlers, each lean burn fuel injector being located in a respective one of the apertures in the annular upstream end wall, the stage of turbine nozzle guide vanes being arranged at the downstream end of the annular combustion chamber, the stage of turbine nozzle guide vanes comprising an annular inner wall, an annular outer wall and a plurality of circumferentially spaced turbine nozzle guide vanes extending between and being secured to the annular inner wall and the annular outer wall, the annular inner wall having an outer surface which has a plurality of outer surface portions and each outer surface portion is positioned between a pair of circumferentially adjacent turbine nozzle guide vanes, the annular outer wall having an inner surface which has a plurality of inner surface portions and each inner surface portion is positioned between a pair of circumferentially adjacent turbine nozzle guide vanes, the annular outer wall having at least one inner surface portion which has a different contoured profile to the contoured profile of a circumferentially adjacent inner surface portion of the annular outer wall or the annular inner wall having at least one outer surface portion which has a different contoured profile to the contoured profile of a circumferentially adjacent outer surface portion of the annular inner wall.

The ratio of the number of nozzle guide vanes to the number of lean burn fuel injectors may be 2 to 1.

The at least one inner surface portion may have a different contoured profile to the contoured profile of a circumferentially adjacent inner surface portion of the annular outer wall and the at least one outer surface portion has a different contoured profile to the contoured profile of a circumferentially adjacent outer surface portion of the annular inner wall.

Each inner surface portion of the annular outer wall may have a different contoured profile to the contoured profile of a circumferentially adjacent inner surface portion of the annular outer wall.

Circumferentially adjacent inner surface portions of the annular outer wall may have different contoured profiles and circumferentially alternate inner surface portions of the annular outer wall may have the same contoured profile.

Each inner surface portion of the annular outer wall may have a different contoured profile to the contoured profile of all of the other inner surface portions of the annular outer wall.

Each inner surface portion of the annular outer wall may have a first region projecting towards the annular inner wall adjacent a suction surface of one of the turbine nozzle guide vanes and adjacent a trailing edge of the one of the turbine nozzle guide vanes, a second region projecting away from the annular inner wall adjacent the pressure surface of the other one of the turbine nozzle guide vanes and adjacent a trailing edge of the other one of the turbine nozzle guide vanes, a third region projecting towards the annular inner wall adjacent a suction surface of one of the turbine nozzle guide vanes and adjacent a leading edge of the one of the turbine nozzle guide vanes, a fourth region projecting towards the annular inner wall adjacent a pressure surface of the other one of the turbine nozzle guide vanes and adjacent a leading edge of the other one of the turbine nozzle guide vanes and a fifth region projecting towards the annular inner wall circumferentially between the third region and the fourth region and between the leading edges of the turbine nozzle guide vanes.

The first region may be a peak, the second region is a trough, the third region is a peak, the fourth region is a peak and the fifth region is a peak. The first region is a region arranged at a lower radius than a mean radius, the second region is a region arranged at a higher radius than a mean radius, the third region is a region arranged at a higher radius than a mean radius, the fourth region is a region arranged at a higher radius than a mean radius and the fifth region is a region arranged at a higher radius than a mean radius.

Each outer surface portion of the annular inner annular may have a different contoured profile to the contoured profile of a circumferentially adjacent outer surface portion of the annular inner wall.

Circumferentially adjacent outer surface portions of the annular inner wall may have different contoured profiles and circumferentially alternate inner surface portions of the annular outer wall may have the same contoured profile.

Each outer surface portion of the annular inner annular may have a different contoured profile to the contoured profile of all of the other outer surface portions of the annular inner wall.

Each outer surface portion of the annular inner wall may have a first region projecting away from the annular outer wall adjacent a suction surface of one of the turbine nozzle guide vanes and adjacent a trailing edge of the one of the turbine nozzle guide vanes, a second region projecting towards the annular outer wall adjacent the pressure surface of the other one of the turbine nozzle guide vanes and adjacent a trailing edge of the other one of the turbine nozzle guide vanes, a third region projecting towards the annular outer wall circumferentially the leading edges of the turbine nozzle guide vanes and adjacent the leading edges of the turbine nozzle guide vanes.

The first region may be a trough, the second region is a trough and the third region is a peak. The first region is a region arranged at a lower radius than a mean radius, the second region is a region arranged at a higher radius than a mean radius and the third region is a region arranged at a higher radius than a mean radius.

The outer surface of the annular inner wall may be non-axisymmetric and non-periodic.

The inner surface of the annular outer wall may be non-axisymmetric and non-periodic.

Each nozzle guide vane leans towards a pressure side at a midspan region, e.g. a region radially midway between the annular inner wall and the annular outer wall and each nozzle guide vane leans towards a suction side adjacent the annular inner wall and adjacent the trailing edge.

Each nozzle guide vane may have a pronounced leading edge.

The outer radius of the outer surface portion of the annular inner wall may vary circumferentially between the circumferentially adjacent vanes. The outer radius of the outer surface portion of the annular inner wall may vary circumferentially between the circumferentially adjacent vanes at all axial positions between the leading edges and the trailing edges of the circumferentially adjacent vanes.

The inner radius of the inner surface portion of the annular outer wall may vary circumferentially between the circumferentially adjacent vanes. The inner radius of the inner surface portion of the annular outer wall may vary circumferentially between the circumferentially adjacent vanes at all axial positions between the leading edges and the trailing edges of the circumferentially adjacent vanes.

The combustion chamber arrangement may be a combustion chamber arrangement of a gas turbine engine. The gas turbine engine may be an aero gas turbine engine, a marine gas turbine engine, an industrial gas turbine engine or an automotive gas turbine engine. The aero gas turbine engine may be a turbofan gas turbine engine, a turbojet gas turbine engine, a turbo-propeller gas turbine engine or a turbo-shaft gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
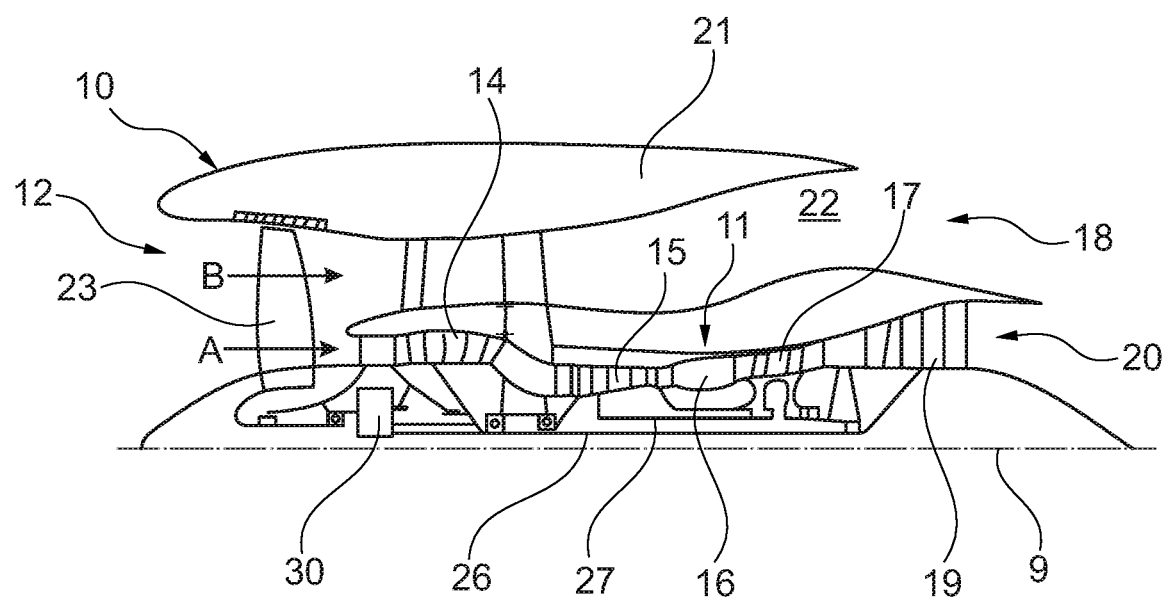
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
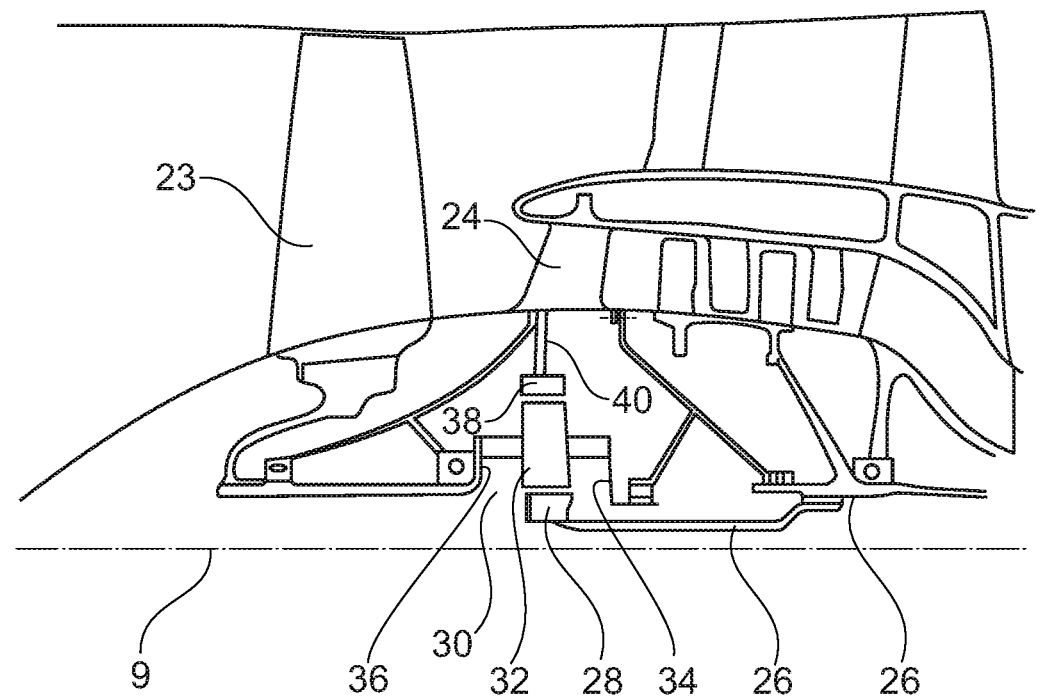
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
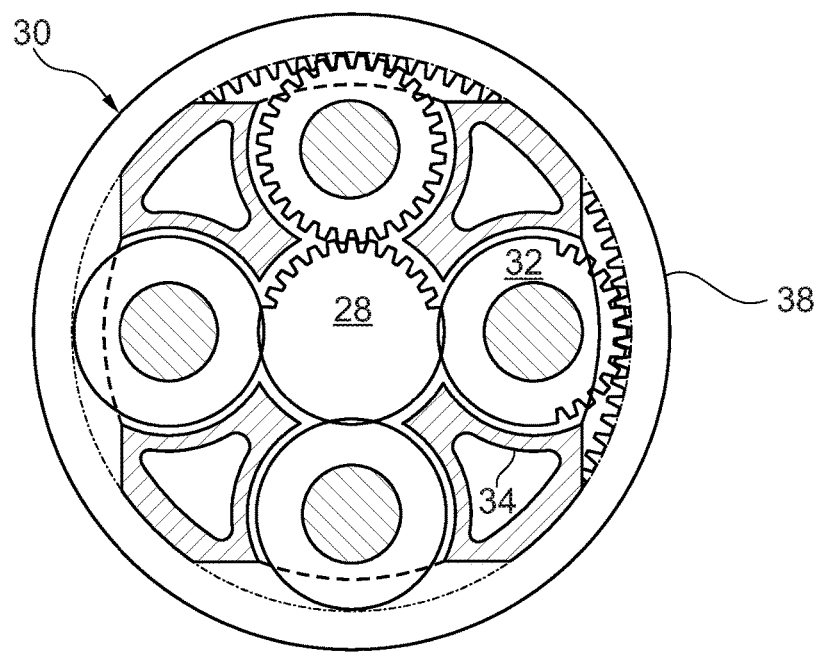
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
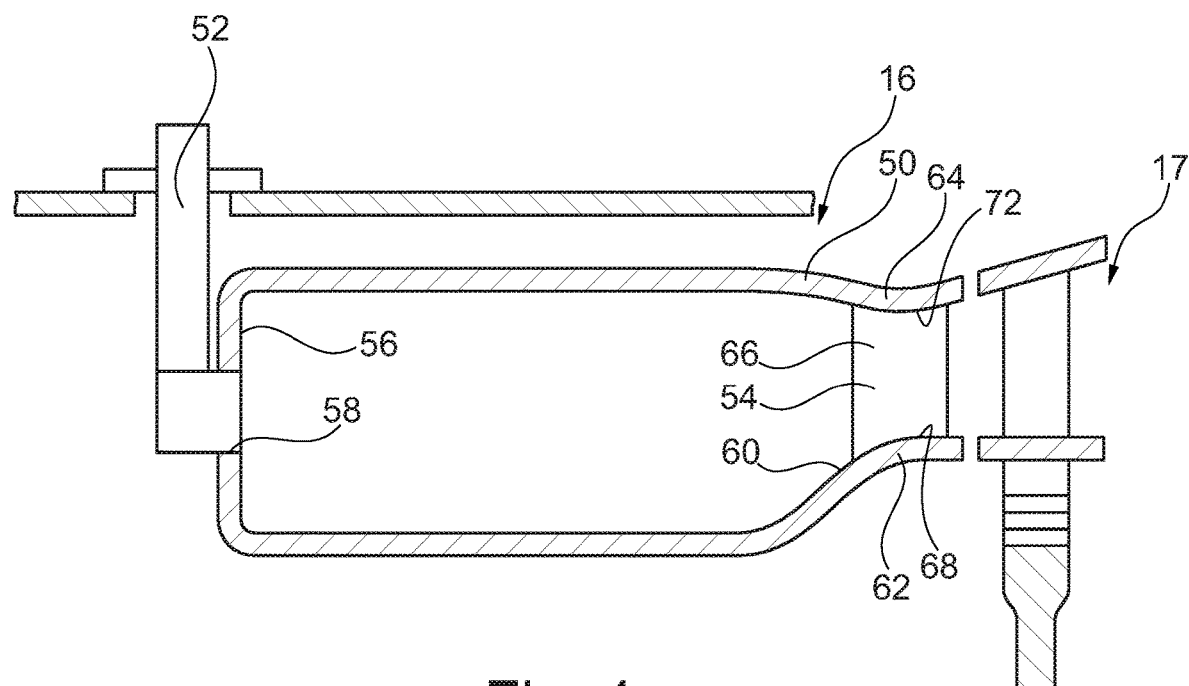
FIG. 4 is an enlarged cross-sectional view through a combustion chamber arrangement according to the present disclosure.

A combustion chamber arrangement 16, as shown in FIG. 4, comprises an annular combustion chamber 50, a plurality of lean burn fuel injectors 52 and a stage of turbine nozzle guide vanes 54. The annular combustion chamber 50 comprises an annular upstream end wall 56 having a plurality of circumferentially spaced apertures 58 and an annular downstream end 60. Each lean burn fuel injector 52 comprises a plurality of coaxial air swirlers and each lean burn fuel injector 52 is located in a respective one of the apertures 58 in the annular upstream end wall 56. The stage of turbine nozzle guide vanes 54 is arranged at the downstream end 60 of the annular combustion chamber 50. The stage of turbine nozzle guide vanes 54 comprises an annular inner wall 62, an annular outer wall 64 and a plurality of circumferentially spaced turbine nozzle guide vanes 66 extending between and being secured to the annular inner wall 62 and the annular outer wall 64. Each vane has a leading edge 63, a trailing edge 65, a convex suction surface 67 extending from the leading edge 63 to the trailing edge 65 and a concave pressure surface extending from the leading edge 63 to the trailing edge 65. The annular inner wall 62 has an outer surface 68 which has a plurality of outer surface portions 70 and each outer surface portion 70 is positioned between a pair of circumferentially adjacent turbine nozzle guide vanes 66. The annular outer wall 64 has an inner surface 72 which has a plurality of inner surface portions 74 and each inner surface portion 74 is positioned between a pair of circumferentially adjacent turbine nozzle guide vanes 66. The annular inner wall 62 may comprise a complete ring and the annular outer wall 64 comprises a complete ring. Alternatively, the annular inner wall 62 may comprise a plurality of circumferentially arranged sections, the annular outer wall 64 comprises a plurality of circumferentially arranged sections each one of which is circumferentially aligned with a corresponding one of the sections of the annular outer wall 62 and at least one turbine nozzle guide vane 66 extends between and is secured to each section of the annular inner wall 62 and the corresponding section of the annular outer wall 64. A plurality of turbine nozzle guide vanes 66 may extend between and are secured to each section of the annular inner wall 62 and the corresponding section of the annular outer wall 64, for example two turbine nozzle guide vanes 66 may extend between and are secured to each section of the annular inner wall 62 and the corresponding section of the annular outer wall 64. The ratio of the number of nozzle guide vanes 66 to the number of lean burn fuel injectors 52 is 2 to 1.

The annular outer wall 64 has at least one inner surface portion 74 which has a different contoured profile to the contoured profile of a circumferentially adjacent inner surface portion 74 of the annular outer wall 64 or the annular inner wall 62 having at least one outer surface portion 70 which has a different contoured profile to the contoured profile of a circumferentially adjacent outer surface portion 70 of the annular inner wall 62. In this arrangement the at least one inner surface portion 74 of the annular outer wall 64 has a different contoured profile to the contoured profile of a circumferentially adjacent inner surface portion 74 of the annular outer wall 64 and the at least one outer surface portion 70 of the annular inner wall 62 has a different contoured profile to the contoured profile of a circumferentially adjacent outer surface portion 70 of the annular inner wall 62.

The outer radius of the outer surface portion 70 of the annular inner wall 62 varies circumferentially between the circumferentially adjacent turbine nozzle guide vanes 66. The outer radius of the outer surface portion 70 of the annular inner wall 62 may vary circumferentially between the circumferentially adjacent turbine nozzle guide vanes 66 at all axial positions between the leading edges 63 and the trailing edges 65 of the circumferentially adjacent turbine nozzle guide vanes 66.

The inner radius of the inner surface portion 74 of the annular outer wall 64 varies circumferentially between the circumferentially adjacent turbine nozzle guide vanes 66. The inner radius of the inner surface portion 74 of the annular outer wall 64 may vary circumferentially between the circumferentially adjacent turbine nozzle guide vanes 66 at all axial positions between the leading edges 63 and the trailing edges 65 of the circumferentially adjacent turbine nozzle guide vanes 66.

The inner radius and the outer radius are measured with respect to the axis 9 of the gas turbine engine 10.

Each inner surface portion 74 of the annular outer wall 64 may have a different contoured profile to the contoured profile of a circumferentially adjacent inner surface portion 74 of the annular outer wall 64.

Circumferentially adjacent inner surface portions 74 of the annular outer wall 64 may have different contoured profiles and circumferentially alternate inner surface portions 74 of the annular outer wall 64 may have the same contoured profile.

Each inner surface portion 74 of the annular outer wall 64 may have a different contoured profile to the contoured profile of all of the other inner surface portions 74 of the annular outer wall 64.

Each inner surface portion 74 of the annular outer wall 64 may have a first region 82 projecting towards the annular inner wall 62 adjacent a suction surface 67 of one of the turbine nozzle guide vanes 66 and adjacent a trailing edge 65 of the one of the turbine nozzle guide vanes 66, a second region 84 projecting away from the annular inner wall 62 adjacent the pressure surface 69 of the other one of the turbine nozzle guide vanes 66 and adjacent a trailing edge 65 of the other one of the turbine nozzle guide vanes 66, a third region 86 projecting towards the annular inner wall 62 adjacent a suction surface 67 of one of the turbine nozzle guide vanes 66 and adjacent a leading edge 63 of the one of the turbine nozzle guide vanes 66, a fourth region 88 projecting towards the annular inner wall 62 adjacent a pressure surface 69 of the other one of the turbine nozzle guide vanes 66 and adjacent a leading edge 63 of the other one of the turbine nozzle guide vanes 66 and a fifth region 90 projecting towards the annular inner wall 62 circumferentially between the third region 86 and the fourth region 88 and between the leading edges 63 of the turbine nozzle guide vanes 66. The fifth region 90 is nearer to the fourth region 88 than the third region 86.

Each outer surface portion 70 of the annular inner annular 62 may have a different contoured profile to the contoured profile of a circumferentially adjacent outer surface portion 70 of the annular inner wall 62.

Circumferentially adjacent outer surface portions 70 of the annular inner wall 62 may have different contoured profiles and circumferentially alternate inner surface portions 70 of the annular outer wall 62 may have the same contoured profile.

Each outer surface portion 70 of the annular inner wall 62 may have a different contoured profile to the contoured profile of all of the other outer surface portions 70 of the annular inner wall 62.

Each outer surface portion 70 of the annular inner wall 62 may have a first region 76 projecting away from the annular outer wall 64 adjacent a suction surface 67 of one of the turbine nozzle guide vanes 66 and adjacent a trailing edge 65 of the one of the turbine nozzle guide vanes 66, a second region 78 projecting towards the annular outer wall 64 adjacent the pressure surface 69 of the other one of the turbine nozzle guide vanes 66 and adjacent a trailing edge 65 of the other one of the turbine nozzle guide vanes 66, a third region 80 projecting towards the annular outer wall 64 circumferentially between the leading edges 63 of the turbine nozzle guide vanes 66 and adjacent the leading edges 63 of the turbine nozzle guide vanes 66.

The outer surface 68 of the annular inner wall 62 may be non-axisymmetric and non-periodic.

The inner surface 72 of the annular outer wall 64 may be non-axisymmetric and non-periodic.

Each turbine nozzle guide vane 66 leans towards a concave pressure surface 69 at a mid-span region, e.g. a region radially midway between the annular inner wall 62 and the annular outer wall 64, each turbine nozzle guide vane 66 leans towards a convex suction surface 67 adjacent the annular inner wall 62 and adjacent the trailing edge 65. Each turbine nozzle guide vane 66 also has a pronounced leading edge 63.

The projections on the outer surface 68 of the annular inner wall 62 are illustrated in figured 5 and 6. The first region 76 has been lowered out of the passage on the suction side 67 of the turbine nozzle guide vane 66 from mid-chord to the trailing edge 65. The first regions 76 are spaced from the suction surfaces 67 of the turbine nozzle guide vanes 66. The mid-chord is midway between the leading edge 63 and the trailing edge 65 of a turbine nozzle guide vane 66. This increases the suction surface 67 static pressure of the turbine nozzle guide vanes 66, thus reducing the cross passage pressure gradient. The design is non-periodic, with the outer surface 68 of the annular inner wall 62 lowered more on the suction side 67 of the turbine nozzle guide vane 66A in the first region 76A than on the suction side 67 of the turbine nozzle guide vane 66B in the first region 76B. The outer surface 68 of the annular inner wall 62 has been significantly raised downstream of the trailing edges 65 of the turbine nozzle guide vanes 66 in the second regions 78. The outer surface 68 of the annular inner wall 62 has been raised midway between the leading edges 63 of the turbine nozzle guide vanes 66 in the third regions 80, but the third regions 80 are not raised as much as the second regions 78. The fourth regions 88 are not lowered as much as the second, third and fifth regions 84, 86 and 90 respectively of the inner surface 72 of the annular outer wall 64.

Figure 7:
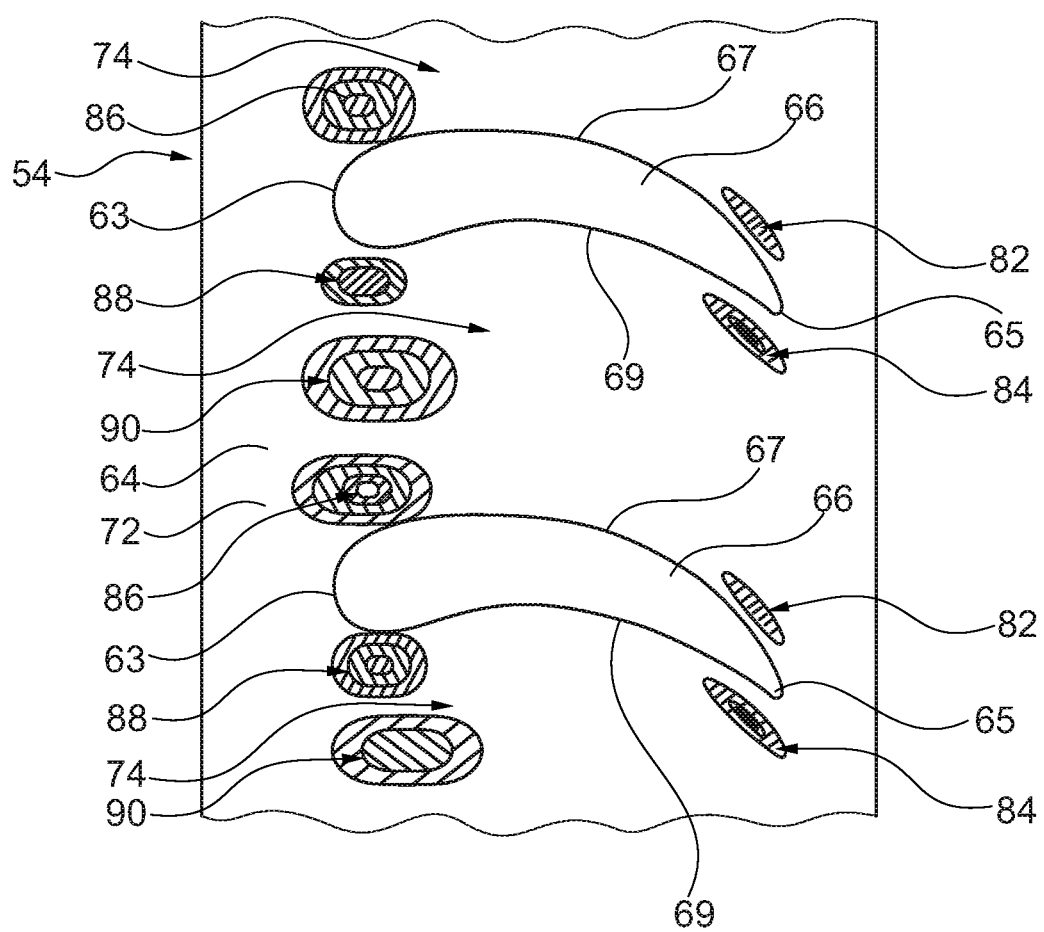
FIG. 7 is a plan view of the annular outer wall of the turbine nozzle guide vanes shown in FIG. 5.

The projections on the inner surface 72 of the annular outer wall 64 are illustrated in FIG. 7.

Figure 5:
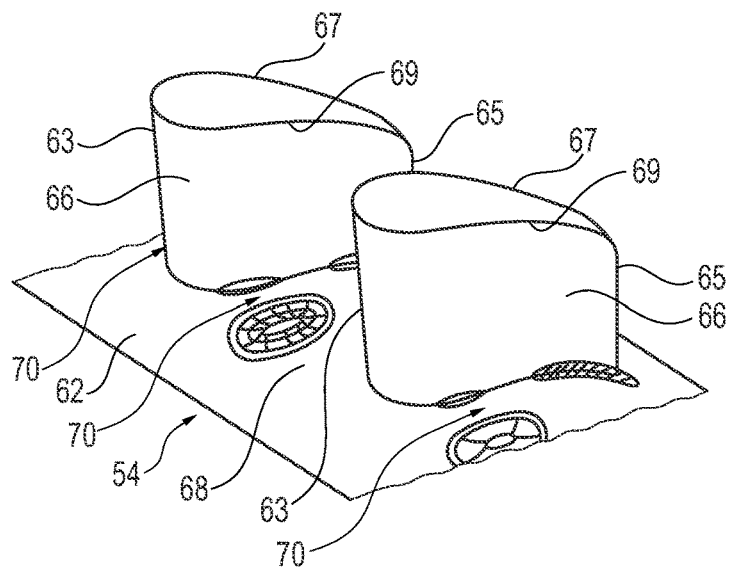
FIG. 5 is a further enlarged perspective view of the turbine nozzle guide vanes of the combustion chamber arrangement shown in FIG. 4.
Figure 6:
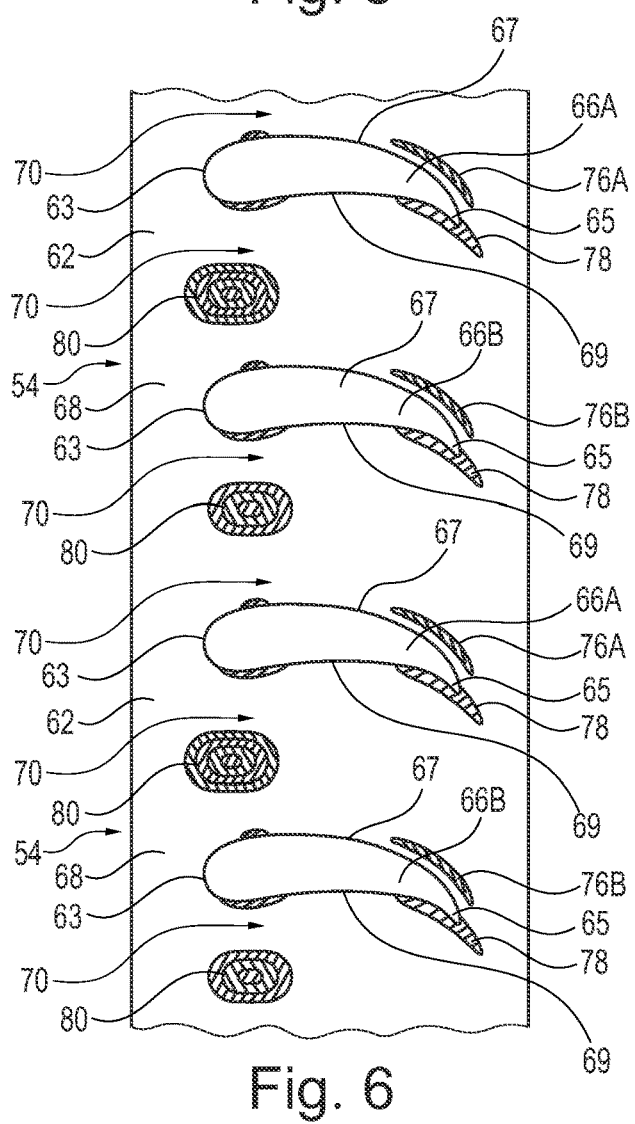
FIG. 6 is a plan view of the annular inner wall of the turbine nozzle guide vanes shown in FIG. 5.

The projections, or perturbations, on the outer surface 68 of the annular inner wall 62 and on the inner surface 72 of the annular outer wall 64 shown in FIGS. 5 to 7 are of the order of up to +/−2 mm, for example +/−0.5 mm to 2 mm, or +/−0.5 to 1.5 mm or +/−0.5 to 1 mm. The projections, or perturbations, on the outer surface 68 of the annular inner wall 62 and on the inner surface 72 of the annular outer wall 64 shown in FIGS. 5 to 7 are of the order of up to +/−3% of the axial chord length between the leading edge 63 and the trailing edge 65 of a turbine nozzle guide vane 66, for example +/−1 to 3% of the axial chord length between the leading edge 63 and trailing edge 65 of a turbine nozzle guide vane 66. The projections, or perturbations, are more pronounced on/in the outer surface 68 of the annular inner wall 62 than on/in the inner surface 72 of the annular outer wall 64. In one example the projections, or perturbations, on the outer surface 68 of the annular inner wall 62 are up to +/−1 mm and the projections, or perturbations, on the inner surface 72 of the annular outer wall 64 are up to +/−1 mm.

All of the projections, or perturbations, on the inner surface 72 of the annular outer wall 64 at the upstream ends of the inner surface portions 74 between the turbine nozzle guide vanes 66 project radially inwardly towards the outer surface 68 of the annular inner wall 62.

Additionally, the projections, or perturbations, first regions 82 on the inner surface 72 of the annular outer wall 64 extend into the passages between the turbine nozzle guide vanes 66 on the suction side 67 of the turbine nozzle guide vanes 66 and the projections, or perturbations, second regions 84 on the inner surface 72 of the annular outer wall 64 extend out of the passages between the turbine nozzle guide vanes 66 on the pressure side 69 of the turbine nozzle guide vanes 66. Whereas, the projections, or perturbations, first regions 76 on the outer surface 68 of the annular inner wall 62 extend out of the passages between the turbine nozzle guide vanes 66 on the suction side 67 of the turbine nozzle guide vanes 66 and the projections, or perturbations, second regions 78 on the outer surface 68 of the annular inner wall 62 extend in to the passages between the turbine nozzle guide vanes 66 on the pressure side 69 of the turbine nozzle guide vanes 66.

The second and the third regions 78 and 80 respectively of the outer surface 68 of the annular inner wall 62 are peaks and the first region 76 of the outer surface 68 of the annular inner wall 62 is a trough. The second, the third, the fourth and the fifth regions 84, 86, 88 and 90 respectively of the inner surface 72 of the annular outer wall 64 are peaks and the first region 82 of the inner surface 72 of the annular outer wall 64 is a trough.

The optimised shape of the inner surface of the annular outer wall alone provides up to a 0.1% increase in efficiency and up to 0.2% increase in flow capacity compared to an arrangement without the optimised shape. The optimised shape of the outer surface of the annular inner wall alone provides a 0.2% to 0.3% increase in efficiency and up to 0.5% increase in flow capacity compared to an arrangement without the optimised shape. The combination of the optimised shape of the turbine nozzle guide vanes, the outer surface of the annular inner wall and the inner surface of the annular outer wall provides a 0.5% to 1% increase in efficiency and up to 0.5% increase in flow capacity compared to an arrangement without the optimised shapes. The highest efficiency improvement is achieved when the shape of the inner surface of the annular outer wall, the shape of the outer surface of the annular inner wall and the shape of the turbine nozzle guide vanes are optimised together.

The non-periodic profiles of the inner surface of the annular outer wall and the outer surface of the annular inner wall mitigate the adverse effects of a given inlet non-uniform total pressure and a large in-flow incidence variations, producing an improved aerodynamic performance, e.g. the non-periodic profiles of the inner surface of the annular outer wall and the outer surface of the annular inner wall mitigate the adverse effects of the swirling flow from the lean burn fuel injectors. The non-periodic profiles of the inner surface of the annular outer wall and the outer surface of the annular inner wall exhibit improved aerodynamic capability and reduce or eliminate the corner flow separations, or vortices, in the passages between the turbine nozzle guide vanes, e.g. the corners at the junctions between the turbine nozzle guide vanes and the inner surface of the annular outer wall and/or the corners at the junctions between the turbine nozzle guide vanes and outer surface of the annular inner wall.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A combustion chamber arrangement comprising an annular combustion chamber, a plurality of lean burn fuel injectors and a stage of turbine nozzle guide vanes, the annular combustion chamber comprising an annular upstream end wall having a plurality of circumferentially spaced apertures and an annular downstream end, each of the plurality of lean burn fuel injectors comprising a plurality of coaxial air swirlers, each of the plurality of lean burn fuel injectors being located in a respective one of the plurality of circumferentially spaced apertures in the annular upstream end wall, the stage of turbine nozzle guide vanes being arranged at the downstream end of the annular combustion chamber, the stage of turbine nozzle guide vanes comprising an annular inner wall, an annular outer wall and a plurality of circumferentially spaced turbine nozzle guide vanes extending between and being secured to the annular inner wall and the annular outer wall, the annular inner wall having an outer surface which has a plurality of outer surface portions and each of the plurality of outer surface portions is positioned between a pair of circumferentially adjacent turbine nozzle guide vanes, the annular outer wall having an inner surface which has a plurality of inner surface portions and each of the plurality of inner surface portions is positioned between the pair of circumferentially adjacent turbine nozzle guide vanes, the annular outer wall having at least one of the plurality of inner surface portions having a different contoured profile to a contoured profile of a respective circumferentially adjacent inner surface portion of the annular outer wall, the annular inner wall having at least one of the plurality of outer surface portions having a different contoured profile to a contoured profile of a respective circumferentially adjacent outer surface portion of the annular inner wall, circumferentially adjacent inner surface portions of the annular outer wall have different contoured profiles, circumferentially alternate inner surface portions of the annular outer wall have the same contoured profile, circumferentially adjacent outer surface portions of the annular inner wall have different contoured profiles, circumferentially alternate outer surface portions of the annular inner wall have the same contoured profile, and each of the plurality of inner surface portions of the annular outer wall has a first region projecting towards the annular inner wall adjacent a suction surface of one of the pair of circumferentially adjacent turbine nozzle guide vanes and adjacent a trailing edge of the one of the pair of circumferentially adjacent turbine nozzle guide vanes, a second region projecting away from the annular inner wall adjacent a pressure surface of the other one of the pair of circumferentially adjacent turbine nozzle guide vanes and adjacent a trailing edge of the other one of the pair of circumferentially adjacent turbine nozzle guide vanes, a third region projecting towards the annular inner wall adjacent the suction surface of the one of pair of circumferentially adjacent turbine nozzle guide vanes and adjacent a leading edge of the one of the pair of circumferentially adjacent turbine nozzle guide vanes, a fourth region projecting towards the annular inner wall adjacent the pressure surface of the other one of the pair of circumferentially adjacent turbine nozzle guide vanes, and adjacent a leading edge of the other one of the pair of circumferentially adjacent turbine nozzle guide vanes, and a fifth region projecting towards the annular inner wall circumferentially between the third region and the fourth region and between the leading edges of the pair of circumferentially adjacent turbine nozzle guide vanes.

2. The combustion chamber arrangement as claimed in claim 1 wherein each of the plurality of inner surface portions of the annular outer wall has the different contoured profile to the contoured profile of the respective circumferentially adjacent inner surface portion of the annular outer wall.

3. The combustion chamber arrangement as claimed in claim 1 wherein each of the plurality of outer surface portions of the annular inner wall has the different contoured profile to the contoured profile of the respective circumferentially adjacent outer surface portion of the annular inner wall.

4. The combustion chamber arrangement as claimed in claim 1 wherein each of the plurality of outer surface portions of the annular inner wall has a first region projecting away from the annular outer wall adjacent the suction surface of the one of the pair of circumferentially adjacent turbine nozzle guide vanes and adjacent the trailing edge of the one of the pair of circumferentially adjacent turbine nozzle guide vanes, a second region projecting towards the annular outer wall adjacent the pressure surface of the other one of the pair of circumferentially adjacent turbine nozzle guide vanes and adjacent a trailing edge of the other one of the pair of circumferentially adjacent turbine nozzle guide vanes, a third region projecting towards the annular outer wall circumferentially between the leading edges of the pair of circumferentially adjacent turbine nozzle guide vanes and adjacent the leading edges of the pair of circumferentially adjacent turbine nozzle guide vanes.

5. The combustion chamber arrangement as claimed in claim 1 wherein the outer surface of the annular inner wall is non-axisymmetric.

6. The combustion chamber arrangement as claimed in claim 1 wherein the inner surface of the annular outer wall is non-axisymmetric.

7. A combustion chamber arrangement as claimed in claim 1 wherein an outer radius of the at least one of the plurality of outer surface portions of the annular inner wall varies circumferentially between the pair of circumferentially adjacent turbine nozzle guide vanes.

8. The combustion chamber arrangement as claimed in claim 7 wherein an outer radius of the at least one of the plurality of outer surface portions of the annular inner wall varies circumferentially between the pair of circumferentially adjacent turbine nozzle guide vanes between the leading edges and the trailing edges of the pair of circumferentially adjacent turbine nozzle guide vanes.

9. The combustion chamber arrangement as claimed in claim 1 wherein an inner radius of the at least one of the plurality of the inner surface portions of the annular outer wall varies circumferentially between the pair of circumferentially adjacent turbine nozzle guide vanes.

10. The combustion chamber arrangement as claimed in claim 9 wherein the inner radius of the at least one of the plurality of the inner surface portions of the annular outer wall varies circumferentially between the pair of circumferentially adjacent turbine nozzle guide vanes between the leading edges and the trailing edges of the pair of circumferentially adjacent turbine nozzle guide vanes.

11. A gas turbine engine comprising the combustion chamber as claimed in claim 1.

12. A gas turbine engine as claimed in claim 11 wherein the gas turbine engine is an aero gas turbine engine, a marine gas turbine engine, an industrial gas turbine engine or an automotive gas turbine engine.

13. A gas turbine engine as claimed in claim 12 wherein the gas turbine engine is an aero gas turbine engine and the gas turbine engine is a turbofan gas turbine engine, a turbojet gas turbine engine, a turbo-propeller gas turbine engine or a turbo-shaft gas turbine engine.

14. A combustion chamber arrangement comprising an annular combustion chamber, a plurality of lean burn fuel injectors and a stage of turbine nozzle guide vanes, the annular combustion chamber comprising an annular upstream end wall having a plurality of circumferentially spaced apertures and an annular downstream end, each of the plurality of lean burn fuel injectors comprising a plurality of coaxial air swirlers, each of the plurality of lean burn fuel injectors being located in a respective one of the plurality of circumferentially spaced apertures in the annular upstream end wall, the stage of turbine nozzle guide vanes being arranged at the downstream end of the annular combustion chamber, the stage of turbine nozzle guide vanes comprising an annular inner wall, an annular outer wall and a plurality of circumferentially spaced turbine nozzle guide vanes extending between and being secured to the annular inner wall and the annular outer wall, the annular inner wall having an outer surface which has a plurality of outer surface portions and each of the plurality of outer surface portions is positioned between a pair of circumferentially adjacent turbine nozzle guide vanes, the annular outer wall having an inner surface which has a plurality of inner surface portions and each of the plurality of inner surface portions is positioned between the pair of circumferentially adjacent turbine nozzle guide vanes, the annular outer wall having at least one of the plurality of inner surface portions having a different contoured profile to a contoured profile of a respective circumferentially adjacent inner surface portion of the annular outer wall, the annular inner wall having at least one of the plurality of outer surface portions having a different contoured profile to a contoured profile of a respective circumferentially adjacent outer surface portion of the annular inner wall, each of the plurality of inner surface portions of the annular outer wall has the different contoured profile to the contoured profile of all of the other inner surface portions of the annular outer wall, each of the plurality of outer surface portions of the annular inner wall has the different contoured profile to the contoured profile of all of the other outer surface portions of the annular inner wall, and each of the plurality of inner surface portions of the annular outer wall has a first region projecting towards the annular inner wall adjacent a suction surface of one of the pair of circumferentially adjacent turbine nozzle guide vanes and adjacent a trailing edge of the one of the pair of circumferentially adjacent turbine nozzle guide vanes, a second region projecting away from the annular inner wall adjacent a pressure surface of the other one of the pair of circumferentially adjacent turbine nozzle guide vanes and adjacent a trailing edge of the other one of the pair of circumferentially adjacent turbine nozzle guide vanes, a third region projecting towards the annular inner wall adjacent the suction surface of the one of the pair of circumferentially adjacent turbine nozzle guide vanes and adjacent a leading edge of the one of the pair of circumferentially adjacent turbine nozzle guide vanes, a fourth region projecting towards the annular inner wall adjacent the pressure surface of the other one of the pair of circumferentially adjacent turbine nozzle guide vanes and adjacent a leading edge of the other one of the pair of circumferentially adjacent turbine nozzle guide vanes and a fifth region projecting towards the annular inner wall circumferentially between the third region and the fourth region and between the leading edges of the pair of circumferentially adjacent turbine nozzle guide vanes.

15. A combustion chamber arrangement comprising an annular combustion chamber, a plurality of lean burn fuel injectors and a stage of turbine nozzle guide vanes, the annular combustion chamber comprising an annular upstream end wall having a plurality of circumferentially spaced apertures and an annular downstream end, each of the plurality of lean burn fuel injectors comprising a plurality of coaxial air swirlers, each of the plurality of lean burn fuel injectors being located in a respective one of the plurality of circumferentially spaced apertures in the annular upstream end wall, the stage of turbine nozzle guide vanes being arranged at the downstream end of the annular combustion chamber, the stage of turbine nozzle guide vanes comprising an annular inner wall, an annular outer wall and a plurality of circumferentially spaced turbine nozzle guide vanes extending between and being secured to the annular inner wall and the annular outer wall, the annular inner wall having an outer surface which has a plurality of outer surface portions and each of the plurality of outer surface portions is positioned between a pair of circumferentially adjacent turbine nozzle guide vanes, the annular outer wall having an inner surface which has a plurality of inner surface portions and each of the plurality of inner surface portions is positioned between the pair of circumferentially adjacent turbine nozzle guide vanes, the annular outer wall having at least one of the plurality of inner surface portions having a different contoured profile to a contoured profile of a respective circumferentially adjacent inner surface portion of the annular outer wall and the annular inner wall having at least one of the plurality of outer surface portions which has a different contoured profile to a contoured profile of a respective circumferentially adjacent outer surface portion of the annular inner wall, each of the plurality of inner surface portions of the annular outer wall has a first region projecting towards the annular inner wall adjacent a suction surface of one of the pair of circumferentially adjacent turbine nozzle guide vanes and adjacent a trailing edge of the one of the pair of circumferentially adjacent turbine nozzle guide vanes, a second region projecting away from the annular inner wall adjacent a pressure surface of the other one of the pair of circumferentially adjacent turbine nozzle guide vanes and adjacent a trailing edge of the other one of the pair of circumferentially adjacent turbine nozzle guide vanes, a third region projecting towards the annular inner wall adjacent the suction surface of the one of the pair of circumferentially adjacent turbine nozzle guide vanes and adjacent a leading edge of the one of the pair of circumferentially adjacent turbine nozzle guide vanes, a fourth region projecting towards the annular inner wall adjacent the pressure surface of the other one of the pair of circumferentially adjacent turbine nozzle guide vanes and adjacent a leading edge of the other one of the pair of circumferentially adjacent turbine nozzle guide vanes and a fifth region projecting towards the annular inner wall circumferentially between the third region and the fourth region and between the leading edges of the pair of circumferentially adjacent turbine nozzle guide vanes, each of the plurality of outer surface portions of the annular inner wall has a first region projecting away from the annular outer wall adjacent the suction surface of the one of the pair of circumferentially adjacent turbine nozzle guide vanes and adjacent the trailing edge of the one of the pair of circumferentially adjacent turbine nozzle guide vanes, a second region projecting towards the annular outer wall adjacent the pressure surface of the other one of the pair of circumferentially adjacent turbine nozzle guide vanes and adjacent the trailing edge of the other one of the pair of circumferentially adjacent turbine nozzle guide vanes, a third region projecting towards the annular outer wall circumferentially between the leading edges of the pair of circumferentially adjacent turbine nozzle guide vanes and adjacent the leading edges of the pair of circumferentially adjacent turbine nozzle guide vanes.

16. A gas turbine engine for an aircraft comprising:
an engine core comprising a turbine, a combustion chamber arrangement, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein:
the combustion chamber arrangement comprising an annular combustion chamber, a plurality of lean burn fuel injectors and a stage of turbine nozzle guide vanes, the annular combustion chamber arrangement comprising an annular upstream end wall having a plurality of circumferentially spaced apertures and an annular downstream end, each of the plurality of lean burn fuel injectors comprising a plurality of coaxial air swirlers, each of the plurality of lean burn fuel injectors being located in a respective one of the plurality of circumferentially spaced apertures in the annular upstream end wall,
the stage of turbine nozzle guide vanes being arranged at the downstream end of the annular combustion chamber, the stage of turbine nozzle guide vanes comprising an annular inner wall, an annular outer wall and a plurality of circumferentially spaced turbine nozzle guide vanes extending between and being secured to the annular inner wall and the annular outer wall,
the annular inner wall having an outer surface which has a plurality of outer surface portions and each of the plurality of outer surface portions is positioned between a pair of circumferentially adjacent turbine nozzle guide vanes,
the annular outer wall having an inner surface which has a plurality of inner surface portions and each of the plurality of inner surface portions is positioned between a-the pair of circumferentially adjacent turbine nozzle guide vanes, the annular outer wall having at least one of the plurality of inner surface portions which has a different contoured profile to a contoured profile of a circumferentially adjacent inner surface portion of the annular outer wall or the annular inner wall having at least one of the plurality of outer surface portions which has a different contoured profile to a contoured profile of a circumferentially adjacent outer surface portion of the annular inner wall, and
each of the plurality of inner surface portions of the annular outer wall has a first region projecting towards the annular inner wall adjacent a suction surface of one of the pair of circumferentially adjacent turbine nozzle guide vanes and adjacent a trailing edge of the one of the pair of circumferentially adjacent turbine nozzle guide vanes, a second region projecting away from the annular inner wall adjacent a pressure surface of the other one of the pair of circumferentially adjacent turbine nozzle guide vanes and adjacent a trailing edge of the other one of the pair of circumferentially adjacent turbine nozzle guide vanes, a third region projecting towards the annular inner wall adjacent the suction surface of the one of the pair of circumferentially adjacent turbine nozzle guide vanes and adjacent a leading edge of the one of the pair of circumferentially adjacent turbine nozzle guide vanes, a fourth region projecting towards the annular inner wall adjacent the pressure surface of the other one of the pair of circumferentially adjacent turbine nozzle guide vanes and adjacent a leading edge of the other one of the pair of circumferentially adjacent turbine nozzle guide vanes and a fifth region projecting towards the annular inner wall circumferentially between the third region and the fourth region and between the leading edges of the pair of circumferentially adjacent turbine nozzle guide vanes.

17. The gas turbine engine according to claim 16 wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

* * * * *